US011792139B2

United States Patent
Pismenny et al.

(10) Patent No.: US 11,792,139 B2
(45) Date of Patent: Oct. 17, 2023

(54) EFFICIENT PACKET REORDERING USING HINTS

(71) Applicant: Mellanox Technologies, Ltd., Yokneam (IL)

(72) Inventors: Boris Pismenny, Haifa (IL); Ben Ben Ishay, Tel Aviv (IL); Gal Yefet, Haifa (IL); Gil Kremer, Hedera (IL); Avi Urman, Yokneam (IL); Yorai Itzhak Zack, Haifa (IL); Khalid Manaa, Majd Alkrum (IL); Liran Liss, Atzmon-Segev (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 91 days.

(21) Appl. No.: 17/582,047

(22) Filed: Jan. 24, 2022

(65) Prior Publication Data

US 2023/0239257 A1 Jul. 27, 2023

(51) Int. Cl.
*H04L 69/22* (2022.01)
*H04L 49/90* (2022.01)
*H04L 49/9057* (2022.01)

(52) U.S. Cl.
CPC ...... *H04L 49/9057* (2013.01); *H04L 49/9042* (2013.01); *H04L 69/22* (2013.01)

(58) Field of Classification Search
CPC .. H04L 49/9057; H04L 49/9042; H04L 69/22
See application file for complete search history.

(56) References Cited

U.S. PATENT DOCUMENTS

| | | | |
|---|---|---|---|
| 6,728,265 B1 | 4/2004 | Yavatkar et al. | |
| 6,799,200 B1 | 9/2004 | Blackmore et al. | |
| 7,209,994 B1 | 4/2007 | Klaiber et al. | |
| 7,222,203 B2 | 5/2007 | Madukkarumukumana et al. | |
| 7,302,511 B2 | 11/2007 | Jeyasingh et al. | |
| 7,616,563 B1 | 11/2009 | Eriksson et al. | |
| 7,930,349 B2 | 4/2011 | Hussain et al. | |
| 8,180,944 B2 | 5/2012 | Serebrin et al. | |

(Continued)

OTHER PUBLICATIONS

U.S. Appl. No. 16/932,765 Office Action dated Oct. 11, 2022.

(Continued)

*Primary Examiner* — Kent Krueger
(74) *Attorney, Agent, or Firm* — KLIGLER & ASSOCIATES PATENT ATTORNEYS LTD

(57) ABSTRACT

A peripheral device coupled to a host includes a network interface, a packet processor, and a Data Processing Unit (DPU). The packet processor receives from a communication network, via the network interface, packets that originated from a source in an original order and received at the peripheral device in as order different from the original order. The packet processor splits the received packets into headers and payloads, sends the payloads for storage in a host memory and sends the headers without the payloads for storage in a DPU memory, and based on the headers produces a hint indicative of processing to be applied to the headers, by the DPU, for identifying the original order. Based on the hint, the DPU identifies the original order of the packets by applying the processing indicated by the hint to respective headers in the DPU memory, and notifies the host of the original order.

13 Claims, 3 Drawing Sheets

(56) References Cited

U.S. PATENT DOCUMENTS

| | | | |
|---|---|---|---|
| 8,306,062 B1 | 11/2012 | Cohen | |
| 8,566,494 B2 | 10/2013 | Li et al. | |
| 8,589,587 B1 | 11/2013 | Michailidis et al. | |
| 8,886,862 B2 | 11/2014 | Kagan | |
| 8,897,132 B2 | 11/2014 | Feroz et al. | |
| 8,949,498 B2 | 2/2015 | Kagan | |
| 8,996,718 B2 | 3/2015 | Biswas | |
| 9,112,819 B2 | 8/2015 | Gopinath et al. | |
| 9,178,805 B2 | 11/2015 | Goel | |
| 9,306,793 B1 | 4/2016 | Craft et al. | |
| 9,391,956 B2 | 7/2016 | Touboul | |
| 9,571,354 B2 | 2/2017 | Annamalaisami et al. | |
| 9,916,269 B1 * | 3/2018 | Machulsky | G06F 13/4068 |
| 9,965,412 B2 | 5/2018 | Liu et al. | |
| 9,965,441 B2 | 5/2018 | Sajeepa et al. | |
| 10,015,104 B2 | 7/2018 | Pope et al. | |
| 10,380,047 B2 | 8/2019 | Degani | |
| 10,467,161 B2 | 11/2019 | Gilboa et al. | |
| 10,505,747 B2 | 12/2019 | Pope et al. | |
| 10,505,848 B2 | 12/2019 | Underwood et al. | |
| 10,642,775 B1 | 5/2020 | Voks et al. | |
| 11,451,647 B2 | 9/2022 | Ariviere et al. | |
| 2005/0165985 A1 * | 7/2005 | Vangal | G06F 13/4027 710/107 |
| 2006/0075142 A1 * | 4/2006 | Cornett | H04L 69/161 709/246 |
| 2006/0182039 A1 | 8/2006 | Jourdain et al. | |
| 2008/0294825 A1 | 11/2008 | Mahalingam et al. | |
| 2010/0023666 A1 | 1/2010 | Mansell et al. | |
| 2010/0070677 A1 | 3/2010 | Thakkar | |
| 2010/0115514 A1 | 5/2010 | Maliszewski et al. | |
| 2010/0174841 A1 | 7/2010 | Bogin et al. | |
| 2010/0191885 A1 | 7/2010 | Serebrin et al. | |
| 2010/0191887 A1 | 7/2010 | Serebrin et al. | |
| 2010/0191888 A1 | 7/2010 | Serebrin et al. | |
| 2010/0191889 A1 | 7/2010 | Serebrin et al. | |
| 2010/0333101 A1 | 12/2010 | Pope et al. | |
| 2011/0106993 A1 | 5/2011 | Arinobu et al. | |
| 2011/0145459 A1 | 6/2011 | Conti et al. | |
| 2011/0179417 A1 | 7/2011 | Inakoshi | |
| 2012/0079175 A1 | 3/2012 | Flynn et al. | |
| 2012/0179742 A1 | 7/2012 | Acharya et al. | |
| 2013/0067193 A1 | 3/2013 | Kagan et al. | |
| 2014/0006667 A1 | 1/2014 | Sun et al. | |
| 2014/0040514 A1 | 2/2014 | Li et al. | |
| 2014/0143455 A1 | 5/2014 | Hayut et al. | |
| 2014/0229946 A1 | 8/2014 | van Riel | |
| 2014/0280813 A1 | 9/2014 | Ramachandran et al. | |
| 2014/0304352 A1 | 10/2014 | Chaudhary et al. | |
| 2014/0310369 A1 | 10/2014 | Makhervaks et al. | |
| 2014/0310439 A1 | 10/2014 | Bshara et al. | |
| 2015/0127849 A1 | 5/2015 | Luo et al. | |
| 2015/0172226 A1 | 6/2015 | Borshteen et al. | |
| 2015/0263968 A1 | 9/2015 | Jain et al. | |
| 2015/0286594 A1 | 10/2015 | Degani | |
| 2015/0304281 A1 | 10/2015 | Kasturi et al. | |
| 2016/0057070 A1 | 2/2016 | Saxena et al. | |
| 2016/0092238 A1 * | 3/2016 | Codrescu | G06F 9/3814 712/200 |
| 2016/0234127 A1 | 8/2016 | Agarwal et al. | |
| 2016/0277478 A1 | 9/2016 | Narasimhamurthy | |
| 2016/0286487 A1 | 9/2016 | Sachs et al. | |
| 2017/0048320 A1 | 2/2017 | Farmahini-Farahani et al. | |
| 2017/0249079 A1 | 8/2017 | Mutha et al. | |
| 2018/0167168 A1 | 6/2018 | Shoens et al. | |
| 2018/0191629 A1 | 7/2018 | Biederman et al. | |
| 2018/0191642 A1 | 7/2018 | Biederman et al. | |
| 2018/0267919 A1 | 9/2018 | Burstein | |
| 2018/0323913 A1 | 11/2018 | Chen | |
| 2019/0044994 A1 | 2/2019 | Sarangam et al. | |
| 2019/0116127 A1 | 4/2019 | Pismenny et al. | |
| 2019/0229903 A1 | 7/2019 | Balasubramanian et al. | |
| 2019/0238460 A1 | 8/2019 | Vasudevan | |
| 2019/0260686 A1 | 8/2019 | Bowers et al. | |
| 2019/0342199 A1 | 11/2019 | Hurson et al. | |
| 2019/0387079 A1 | 12/2019 | Pismenny et al. | |
| 2020/0068048 A1 | 2/2020 | Hermesh et al. | |
| 2020/0117605 A1 | 4/2020 | Cornett et al. | |
| 2020/0133909 A1 | 4/2020 | Hefty et al. | |
| 2020/0210359 A1 | 7/2020 | Cornett et al. | |
| 2020/0313999 A1 | 10/2020 | Lee et al. | |
| 2020/0389399 A1 | 12/2020 | Wang et al. | |
| 2020/0403919 A1 | 12/2020 | Cui et al. | |
| 2020/0412659 A1 | 12/2020 | Arditti Ilitzky et al. | |
| 2021/0092069 A1 | 3/2021 | Musleh et al. | |
| 2021/0111996 A1 | 4/2021 | Pismenny et al. | |
| 2021/0117360 A1 | 4/2021 | Kutch et al. | |
| 2021/0243247 A1 | 8/2021 | He et al. | |
| 2021/0288910 A1 | 9/2021 | Daly et al. | |
| 2021/0297360 A1 | 9/2021 | Park et al. | |
| 2021/0320866 A1 | 10/2021 | Le et al. | |
| 2021/0328930 A1 | 10/2021 | Nikolaidis et al. | |
| 2021/0352023 A1 | 11/2021 | Syrivelis et al. | |
| 2022/0021629 A1 | 1/2022 | Yefet et al. | |
| 2022/0085916 A1 | 3/2022 | Debbage et al. | |
| 2022/0124182 A1 | 4/2022 | Galles et al. | |

OTHER PUBLICATIONS

U.S. Appl. No. 16/932,765 Office Action dated Jun. 2, 2022.
U.S. Appl. No. 17/151,697 Office Action dated Jun. 16, 2022.
Mellanox Technologies, "WinOF VPI for Windows", User Manual, pp. 1-117, Rev 4.40, Jul. 9, 2013.
Melllanox Technologies, "Linux/drivers/net/ethernet/mellanox/mlx4/en_cq.c", version 4.1, pp. 1-4, year 2007.
Mellanox Technologies, "Linux/drivers/net/ethernet/mellanox/mlx4/en_netdev.c", version 4.1, pp. 1-41, year 2007.
Intel Corporation, "Linux/drivers/net/ethernet/intel/ixgbe/ixgbe_main.c", pp. 1-92, version 4.1., years 1999-2014.
Intel Corporation, "Intel® Xeon® Processor E5-2600 v31 Product Family", Product brief, pp. 1-5, Aug. 21, 2014.
Kernelnewbies, "Linux4.18—Linux Kernel Newbies", pp. 1-16, Aug. 12, 2018 downloaded from https://kernelnewbies.org/Linux_4.18.
NVMe Over Fabrics standard, "NVM Express over Fabrics," Revision 1.1, pp. 1-82, Oct. 22, 2019.
Rescorla et al., "The Transport Layer Security (TLS) Protocol Version 1.3", Request for Comments 8446, pp. 1-160, Aug. 2018.
Belshe et al., "Hypertext Transfer Protocol Version 2 (HTTP/2)", Request for Comments 7540, pp. 1-96, May 2015.
Microsoft, "Receive Segment Coalescing (RSC)", pp. 1-3, Aug. 31, 2016 downloaded from https://docs.microsoft.com/en-us/previous-versions/windows/it-pro/windows-server-2012-r2-and-2012/hh997024(v=ws.11)#receive-segment-coalescing-rsc-1.
Corbert, "A reworked TCP zero-copy receive API", LWN.net, pp. 1-4, May 18, 2018 downloaded from https://lwn.net/Articles/754681/.
Burstein et al., U.S. Appl. No. 17/189,303, filed Mar. 2, 2021.
Eran et al., U.S. Appl. No. 17/488,362, filed Sep. 29, 2021.
U.S. Appl. No. 16/932,765 Office Action dated Feb. 1, 2022.
U.S. Appl. No. 17/151,697 Office Action dated Mar. 3, 2022.
"Nvidia Mellanox Bluefield-2 Data Processing Unit (DPU)," Product Brief, Mellanox Technologies, pp. 1-4, Aug. 2020.
Gerlitz et al., U.S. Appl. No. 17/151,697, filed Jan. 19, 2021.
U.S. Appl. No. 16/932,765 Office Action dated Mar. 16, 2023.

* cited by examiner

EFFICIENT PACKET REORDERING USING HINTS

TECHNICAL FIELD

Embodiments described herein relate generally to data communication, and particularly to methods and systems for efficient packet reordering using hints.

BACKGROUND

In various computing systems, a source device sends packets to a destination device over a communication network. The packets originated from the host are sent in some original order but may be received at the destination in a different order. Based on transport layer processing, the destination can recover the original order of the received packets.

SUMMARY

An embodiment that is described herein provides a peripheral device that includes a network interface, a host interface, a packet processor and a Data Processing Unit (DPU). The network interface communicates packets over a communication network. The host interface communicates with a host coupled to the peripheral device. The packet processor receives multiple packets from a remote source over the communication network, the packets originated from the remote source in an original order and were received at the peripheral device in an order of arrival different from the original order. The packet processor splits the received packets into respective headers and payloads, sends the payloads for storage in a host memory of the host, via the host interface, and sends the headers without the payloads for storage in a DPU memory, and based on the headers of the received packets, produces a hint indicative of processing to be applied to the headers in the DPU memory, by the DPU, for identifying the original order of at least some of the multiple packets. The DPU receives the hint from the packet processor, identifies the original order of the at least some of the packets by applying the processing indicated by the hint to the respective headers in the DPU memory, and notifies the host of the original order.

In some embodiments, the packet processor identifies among the multiple packets two or more packets that were received in the original order, and reports to the DPU, in the hint, respective identities of the two or more packets that were received in the original order, the hint indicates to the DPU to refrain from identifying the original order of the identified two or more packets. In other embodiments, the DPU notifies the host of a merged payload including the payloads of the identified two or more packets. In yet other embodiments, the DPU identifies the original order of packets that were received in an order different from the original order.

In an embodiment, the packet processor sends the payloads for storage in the host memory by translating a virtual address associated with an address space assigned to a Hypervisor or a Virtual Machine (VM) running on the host, into a respective physical address in the host memory. In another embodiment, the DPU accesses the headers in one or more header buffers in the DPU memory by executing Work Queue Elements (WQEs) in the DPU memory. In yet another embodiment, the DPU processes the headers in the DPU memory in accordance with a transport layer protocol used for communication between the host and the remote source. In yet further another embodiment, the transport layer protocol belongs to a list including a Transmission Control Protocol (TCP) and a Datagram Congestion Control Protocol (DCCP).

There is additionally provided, in accordance with an embodiment that is described herein, a method for communication, including, in a peripheral device that mediates communication between a host and remote devices over a communication network, receiving by a packet processor multiple packets from a remote source over the communication network, the packets originated from the remote source in an original order and were received at the peripheral device in an order of arrival different from the original order. The received packets are split into respective headers and payloads. The payloads are sent for storage in a host memory of the host, and the headers are sent without the payloads for storage in a Data Processing Unit (DPU) memory of a DPU. A hint is produced based on the headers of the received packets, the hint is indicative of processing to be applied to the headers in the DPU memory, by the DPU, for identifying the original order of at least some of the multiple packets. The hint from the packet processor is received by the DPU. The original order of the at least some of the packets is identified, by applying the processing indicated by the hint to the respective headers in the DPU memory. The host is notified of the original order.

There is additionally provided, in accordance with an embodiment that is described herein, a method for packet reordering, including, receiving packets destined for a host, in an order different from an original order in which the packets originated from a remote source. The payloads of the packets are stored in a host memory of the host, and the headers of the packets, without the payloads, are stored in a Data Processing Unit (DPU) memory of a DPU. The original order of the packets is identified by processing the headers in the DPU memory, as indicated by a hint produced based on the headers of the received packets. The host is notified of the original order.

These and other embodiments will be more fully understood from the following detailed description of the embodiments thereof, taken together with the drawings in which:

DETAILED DESCRIPTION OF EMBODIMENTS

Overview

Figure 1:
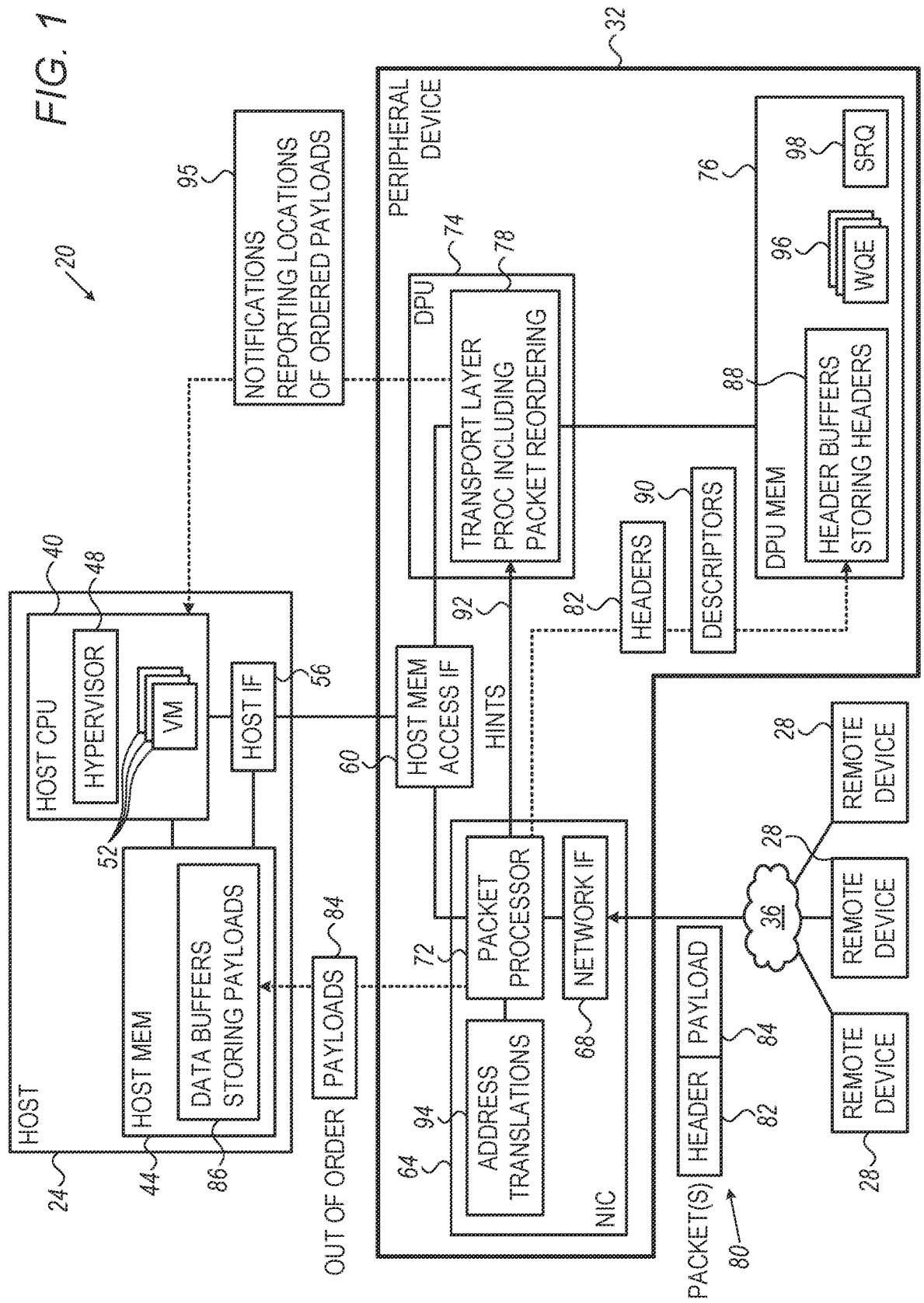
FIG. 1 is a block diagram that schematically illustrates a computer system in which hints assist with efficient packet reordering, in accordance with an embodiment that is described herein.

Embodiments that are described herein provide improved methods and systems for efficient identification of the original order of packets as sent, using hints.

In various computing systems, a host communicates with remote devices over a communication network comprising an underlying transport layer protocol such as, for example, the Transmission Control Protocol (TCP). The transport layer protocol may require large amounts of host resources and is therefore sometimes offloaded to another processor external to the host. The external processor may comprise, for example, a Data Processing Unit (DPU) residing, e.g., in a peripheral device that mediates between the host and communication network. The peripheral device typically comprises a network adapter such as a Network Interface Controller (NIC) for accessing the communication network, and a memory access interface for accessing the host memory.

In a computing system as described above, a remote device may send to the host a sequence of packets in some original order. The packets may, however, received at the peripheral device in an order of arrival different from the original order, for various reasons. For example, different packets may traverse different paths in the communication network having different respective latencies. As another example, some packets may be delayed in a network switch due to higher-priority packets traversing that network switch.

In some embodiments, the NIC splits between the headers and payloads of the received packets, sends the payloads for storage in a host memory and sends the headers for storage in the DPU memory. In principle, the DPU could process the headers using the underlying transport layer protocol, including reordering of all the packets in accordance with the original order. Processing the entire received packets to recover their original order rather than processing only packets that were received out of order may, however, incur long latency, reduce reception throughput, and consume DPU computing resources.

Techniques for transport layer packet reordering are known in the art. For example, U.S. patent application Ser. No. 17/488,362 of Eran et al. describes a network interface controller device comprising a network interface, a memory access interface, a data processing unit, and a packet processing unit. The network interface is to be connected to a packet data network, and to receive packets over the packet data network. The memory access interface is to share data with a host device. The packet processing circuitry is to split data of the packets into respective headers and respective payloads, to store the respective payloads at respective locations in a host memory of the host device, and to store the respective headers, without the respective payloads, in the data processing unit memory with descriptors indicative of the respective locations in the host memory at which the respective payloads are stored. The data processing unit is to process the respective headers, wherein the packet processing circuitry is configured, upon completion of the processing of the respective headers by the data processing unit, to send respective completion messages to the host device over the memory access interface.

In the disclosed embodiments, the NIC identifies subsequences of the received packets that were received in the original order, and therefore require no reordering. The NIC generates a hint indicating such a subsequence to the DPU, which in turn skips reordering the reported packets based on the hint.

Consider an embodiment of a peripheral device comprising a network interface, a network interface, a host interface, a packet processor and a DPU. The network interface communicates packets over a communication network. The host interface communicates with a host coupled to the peripheral device. The packet processor receives multiple packets from a remote source over the communication network, wherein the packets originated from the remote source in an original order and were received at the peripheral device in an order of arrival different from the original order. The packet processor splits the received packets into respective headers and payloads, and (i) sends the payloads for storage in a host memory of the host, via the host interface, and (ii) sends the headers without the payloads for storage in a Data Processing Unit (DPU) memory. Based on the headers of the received packets, the packet processor produces a hint indicative of processing to be applied to the headers in the DPU memory, by the DPU, for identifying the original order of at least some of the multiple packets. The DPU receives the hint from the packet processor, identifies the original order of the at least some of the packets, by applying the processing indicated by the hint to the respective headers in the DPU memory, and notifies the host of the original order.

In some embodiments, the packet processor identifies among the multiple packets two or more packets that were received in the original order, and reports to the DPU, in the hint, respective identities of the two or more packets that were received in the original order, wherein the hint indicates to the DPU to refrain from identifying the original order of the identified two or more packets. In some embodiments, the DPU notifies the host of a merged payload comprising the payloads of the identified two or more packets. The DPU further identifies the original order of packets that were received in an order different from the original order.

In some embodiments, the DPU processes the headers in the DPU memory in accordance with a transport layer protocol used for communication between the host and the remote source. The transport layer protocol may belong to a list comprising a Transmission Control Protocol (TCP) and a Datagram Congestion Control Protocol (DCCP).

In the disclosed techniques, a DPU that offloads transport layer processing from a host, performs efficient packet reordering using hints generated by a packet processor. A hint is indicative of processing to be applied to packets that were received in the original order and therefore their reordering may be skipped. Consequently, the DPU can report such packets with low latencies, and with reduced computational resources and power consumed by the DPU. Moreover, low-volume data is copied from the DPU to the host, because the DPU sends to the host only notifications specifying the original order, and not the ordered packets themselves.

Using the disclosed embodiments results in improved throughput of handling incoming traffic, relative to conventional packet reordering methods.

System Description

FIG. 1 is a block diagram that schematically illustrates a computer system 20 in which hints assist with efficient packet reordering, in accordance with an embodiment that is described herein.

Computer system 20 comprises a host 24 that communicates with remote devices 28, via a peripheral device 32, over a communication network 36. Computer system 20 may be used in various applications such as, for example, a data center, a High-Performance Computing (HPC) system, and the like.

In general, the disclosed embodiments are applicable in applications and/or protocols that benefit from receiving large data chunks assembled from multiple payloads of received packets, rather than receiving separate small payloads. Example relevant applications include storage applications and protocols such as the NVM Express (NVMe)

over TCP protocol, the Internet Small Computer Systems Interface (iSCSI) protocol, the Server Message Block (SMB) protocol, and the Network File System (NFS) protocol. The disclosed embodiments are also applicable in protocols that use the Graphics Processing Unit (GPU) direct technology, and in Remote Procedure Call (RPC) applications that are required to pass large data chunks.

Communication network 36 may comprise any suitable packet network operating in accordance with any suitable communication protocols. In some embodiments, communication network 36 comprises an Ethernet network over which packets are communicated in accordance with a suitable transport layer protocol. The transport layer protocol may comprise, for example, a Transmission Control Protocol (TCP), a Datagram Congestion Control Protocol (DCCP) or other suitable reliable protocols.

In the present example, host 24 comprises a Central Processing Unit (CPU) 40 and a host memory 44. CPU 40 may run any suitable programs and/or applications, virtualized or nonvirtualized. In the example of FIG. 1, CPU 40 runs a Hypervisor 48 that controls the virtualization of one or more Virtual Machines (VMs) 52. Host 24 further comprises a host interface 56 via which peripheral device 32 accesses host memory 44. Host interface 56 may comprise any suitable interface, such as, for example a Peripheral Component Interconnect Express (PCIe) bus.

Peripheral device 32 mediates between host 24 and communication network 36. To this end, the peripheral device comprises a host memory access interface 60 for accessing host memory 44, and a network adapter 64 for accessing communication network 36. Network adapter 64 may comprise, for example, a Network Interface Controller (NIC), or any other suitable type of a network adapter. NIC 64 comprises a network interface 68 for interfacing with communication network 36, and a packet processor 72 that processes incoming and outgoing packets.

Peripheral device 32 further comprises a Data Processing Unit (DPU) 74 coupled to a DPU memory 76. The DPU may comprise any suitable type of a processing unit such as, for example, a processor having a Reduced Instruction Set Computing (RISC) architecture, e.g., an ARM processor.

Among other tasks, DPU 74 runs transport layer processing 78 implemented, e.g., as a TCP stack, to be applied to incoming (and outgoing) packets. The DPU thus offloads transport layer processing from host 24. Transport layer processing 78 typically includes packet reordering of received packets, as will be described below.

Packet processor 72 receives via network interface 68 packets 80 originating from a remote device 28, wherein each packet comprises a header 82 and a payload 84. Packets 80 are destined for host 24, meaning that the packets were sent by the remote device, over the communication network, to a destination target on host 24, e.g., a VM 52 or some application program running on the host (not shown). The packets were sent by the remote device in an original order but may be received in the peripheral device in an order of arrival different from the original order. The packets may arrive out of order due to, for example, being sent over multiple different paths over the communication network, the different paths possibly having different latencies. The packets may also be queued and delayed differently within switches in the communication network based, for example, on priorities of other packets traversing the switches.

In some embodiments, packet processor 72 splits each received packet 80 into its header 82 and payload 84, and (i) sends the payloads (84) for storage in data buffers 86 in host memory 44, and (ii) sends the headers (82) for storage in header buffers 88 in DPU memory 76. In some embodiments, the packet processor sends to the DPU descriptors 90, each of which is indicative of the respective locations in the host memory 44 at which the respective payloads 84 are stored. Based on the headers of the received packets, the packet processor generates hints 92 indicative of processing to be applied to the headers in the DPU memory for identifying the original order.

In some embodiments, packet processor 72 sends payloads for storage in selected physical address spaces in the host memory. The physical address spaces are respectively associated with Hypervisor 48, and/or with one or more VMs 52. In an embodiment, the packet processor holds address translations 94, each of which is identified by a handler referred to herein as a Memory Key (MKey). The packet processor uses an address translation 94 for translating between a virtual address and a respective physical address in the host memory. In some embodiments, the packet processor uses address translations 94 also for translating virtual addresses to respective physical addresses in the DPU memory.

In some embodiments, DPU 74 receives hints 92 from packet processor 72, and uses these hints in performing efficient packet reordering. Based on hints 92, DPU 74 processes headers 82 in the DPU memory for efficiently identifying the original order of the received packets. The DPU notifies host 24 of the identified original order so that host 24 may process payloads 84 in the host memory in accordance with the original order. For example, the DPU sends to host 24 notifications 95 reporting locations of payloads in host memory 44 in accordance with the original order.

In some embodiments, the DPU accesses headers in the DPU memory by executing Work Queue Elements (WQEs) 96 in the DPU memory. In some embodiments, the WQEs point to respective header buffers 88 in the DPU memory.

In some embodiments, the DPU comprises a Shared Receive Queue (SRQ) 98. The SRQ comprises descriptors (e.g., descriptors 90) pointing to data buffers 86 in the host memory. In some embodiments, upon receiving a packet from the communication network, the packet processor sends to the DPU an indication specifying (i) an index in a header buffer 88 for storing the packet's header, and (ii) the header size. In an embodiment, the DPU uses the SRQ for sharing header buffers 88 among multiple communication connections established by host 24.

The configurations of communication computer system 20, host 24, peripheral device 32 and communication network 36 are example configurations, which are chosen purely for the sake of conceptual clarity. In alternative embodiments, any other suitable computer system, host, peripheral device, and communication network configurations can also be used. Elements that are not necessary for understanding the principles of the present invention, such as various interfaces, addressing circuits, timing and sequencing circuits and debugging circuits, have been omitted from the figure for clarity.

Some elements of host 24, such as CPU 40 and host interface 56, some elements of peripheral device 32 such as packet processor 72 and network interface 68 of NIC 64, host memory access interface 60 and DPU 74, may be implemented in hardware, e.g., in one or more Application-Specific Integrated Circuits (ASICs) or FPGAs. Additionally or alternatively, packet processor 72, network interface 68, host memory access interface 60 and DPU 74, can be implemented using software, or using a combination of hardware and software elements. Host memory 44 of host 24 and DPU memory 76 of DPU 74 may comprise any suitable storage element such as, for example, a Random-Access Memory (RAM), or a Nonvolatile (NVM) memory such as a Flash memory device.

In some embodiments, some of the functions of packet processor 72, CPU 40 and DPU 74 may be carried out by general-purpose processors, which are programmed in software to carry out the functions described herein. The software may be downloaded to the relevant processor in electronic form, over a network, for example, or it may, alternatively or additionally, be provided and/or stored on non-transitory tangible media, such as magnetic, optical, or electronic memory.

Methods for Efficient Packet Reordering Using Hints

Figure 2:
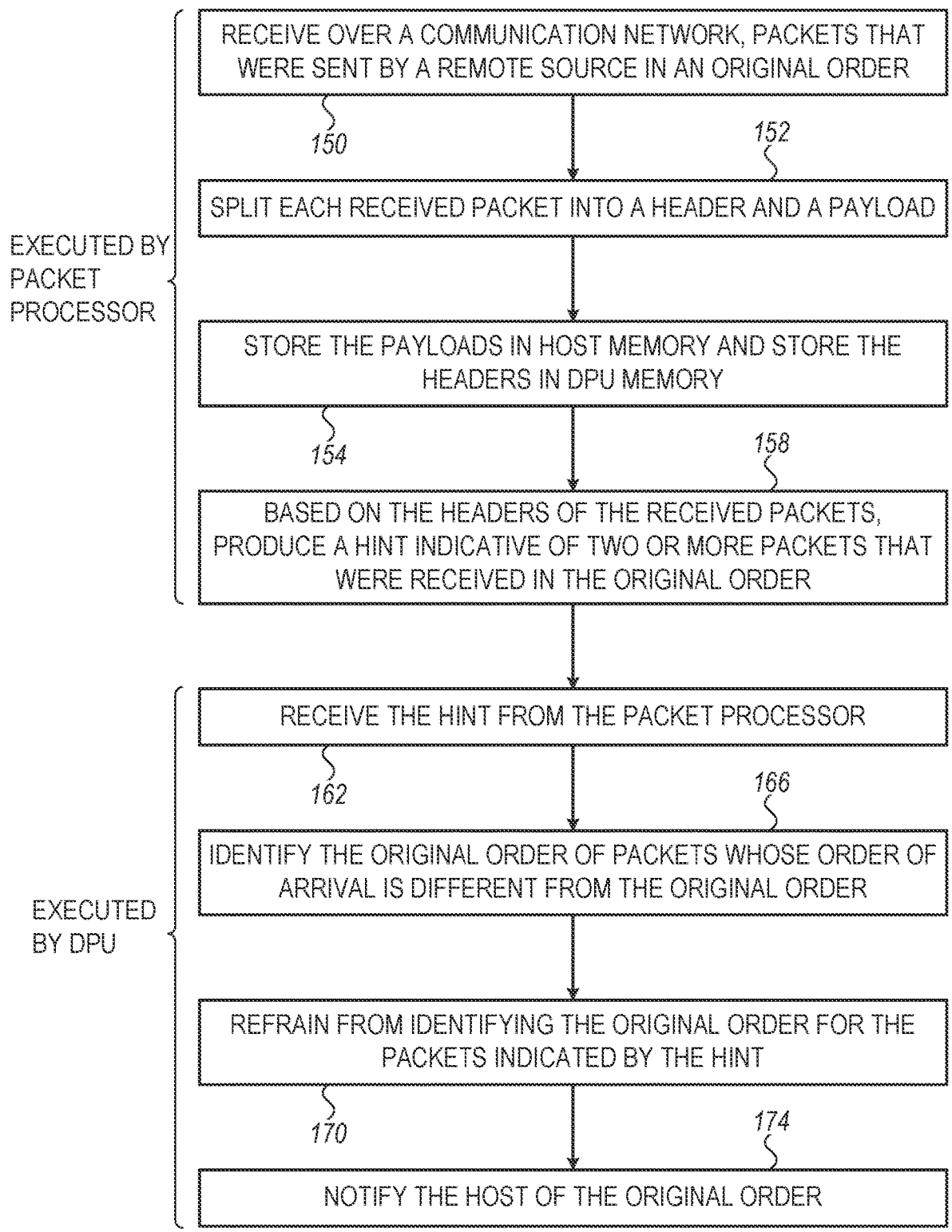
FIG. 2 is a flow chart that schematically illustrates a method for efficient packet reordering using hints, in accordance with an embodiment that is described herein.

FIG. 2 is a flow chart that schematically illustrates a method for efficient packet reordering using hints, in accordance with an embodiment that is described herein.

The method may be executed by elements of peripheral device 32 of computer system 20 of FIG. 1.

The method begins at a packet reception step 150, with packet processor 72 receiving, over communication network 36, packets 80 that were sent by a remote source (e.g., a remote device 28) in an original order. A sequence of the received packets may contain subsequences in which the packets are not in the original order, and other subsequences in which the packets are in the original order.

At a packet splitting step 152, the packet processor splits each packet 80 into a header 82 and a payload 84. At a storage step 154, the packet processor sends payloads 84 for storage in data buffers 86 in host memory 44 and sends headers 82 (without payloads 84) for storage in header buffers 88 in DPU memory 76. In some embodiments, the packet processor produces descriptors for the received packets, and sends the descriptors for storage in the DPU memory in association with the headers of the packets. In an embodiment, a packet descriptor is indicative of the location of the respective payload in the host memory.

At a hint generation step 158, the packet processor processes the headers 82 of the received packets 80, and based on the headers of the received packets, produces a hint 92 indicative of processing to be applied to the headers in the DPU memory, by the DPU, for identifying the original order of at least some of the received packets. In an example embodiment, the hint is indicative of two or more packets that were received in the original order and therefore require no reordering by the DPU. In this case, the hint indicates to the DPU to refrain from the reordering of these two or more packets.

In an embodiment, the host communicates with the remote devices using a suitable transport layer protocol (e.g., TCP). In such embodiments the packet processor identifies the two or more packets that were received in the original order by parsing the headers of the received packets in accordance with the underlying transport layer protocol. This header parsing allows to retrieve sequence numbers carried respectively in headers of the received packets, and to detect two or more consecutive packets among the received packets having consecutive sequence numbers. In some embodiments, the packet processor reports to the DPU, in the hint, respective identities of the two or more packets that were received in the original order, wherein the hint indicates to the DPU to refrain from identifying the original order of the identified two or more packets.

At a hint reception step 162, DPU 74 receives hint 92 from the packet processor. At a non-hinter reordering step 166 the DPU identifies the original order of some of the received packets whose order of arrival is different from the original order. For example, the DPU identifies the original order for these packets based on their respective sequence numbers.

At a hint-based processing step 170, the DPU applies the processing indicated by the hint to the respective headers of the two or more packets (that were received in the original order) in the DPU memory. In some embodiments, based on the hint, the DPU refrains from identifying the original order for received packets that were received in the original order, as indicated by hint 92.

At a notification step 174, the DPU notifies the original order for both the packets that were reordered at step 166, and the packets that needed no reordering at step 170. Following step 174 the method terminates. In some embodiments, a notification message from the DPU to the host comprises an ordered list of payload locations in the host memory, in accordance with the original order as identified by the DPU.

In some embodiments, instead of separately notifying to the host each of the packets that were received in the original order, the DPU notifies the host of a merged payload comprising the payloads of the packets that were received in the original order.

In the method of FIG. 2, by skipping (based on the host) reordering for packets that were received at the original order, the delay in notifying the host of the original order reduces and the overall ingress throughput improves significantly.

Figure 3:
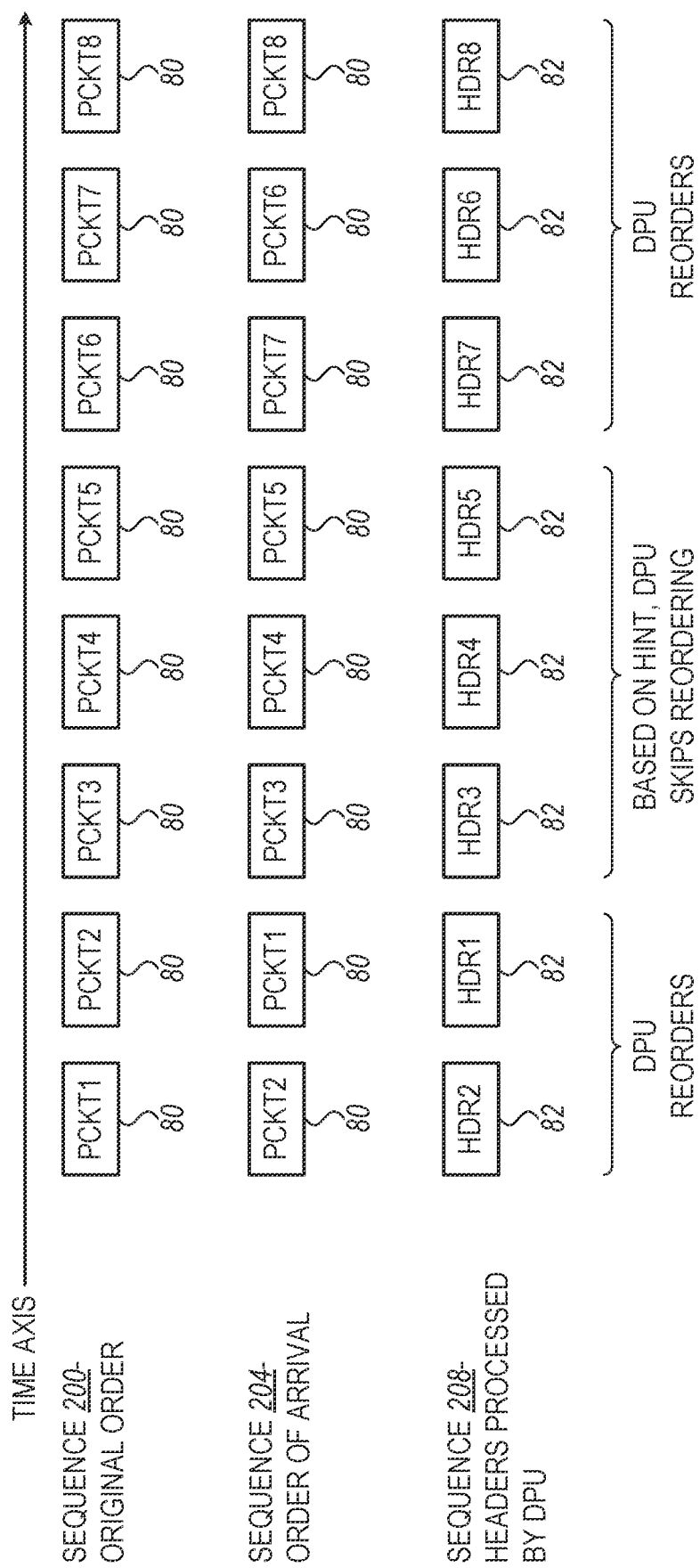
FIG. 3 is a diagram that schematically illustrates a sequence of packets, some of which require no reordering as indicated by a hint, in accordance with an embodiment that is described herein.

FIG. 3 is a diagram that schematically illustrate a sequence of packets, some of which require no reordering as indicated by a hint, in accordance with an embodiment that is described herein.

FIG. 3 depicts a sequence 200 of packets 80 originated by a remote source in an original order denoted PCKT1 . . . PCKT8. A sequence 204 depicts the packets of sequence 200 arriving at the peripheral device 32 in an order different from the original order. As seen in the figure, the packets arrive in an order PCKT2, PCKT1, PCKT3, PCKT4, PCKT5, PCKT7, PCKT6, PCKT8.

A sequence 212 depicts headers 82 that the packet processor has split from the received packets 80. In the present example, each of the subsequences (PCKT1, PCKT2) and (PCKT6, PCKT7, PCKT8) were received in an order different from original order, and therefore the DPU is required to identify the original order of the packets in these subsequences. The packets PCKT3, PCKT4 and PCKT5, on the other hand, were received in the original order, and therefore are reported in a hint 92 to the DPU, as explained above. Based on the hint, the DPU may efficiently skip the reordering of the packets PCKT3, PCKT4 and PCKT5, and notify the host accordingly. Skipping the reordering of PCKT3, PCKT4 and PCKT5 reduces the latency in notifying the original order to the host and reduces the computational resources required and power consumed by the DPU.

The embodiments described above are given by way of example, and other suitable embodiments can also be used.

Although the embodiments described herein mainly address efficient reordering of received packets in TCP, the methods and systems described herein can also be used in various applications, such as, for example, network storage, applications using GPU direct technology, and Remote Procedure Call (RPC).

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A peripheral device, comprising:
a network interface, to communicate packets over a communication network;
a host interface, to communicate with a host coupled to the peripheral device;
a Data Processing Unit (DPU) coupled to a DPU memory;
a packet processor, to:
receive multiple packets from a remote source over the communication network, wherein the packets originated from the remote source in an original order and were received at the peripheral device in an order of arrival different from the original order;
split the received packets into respective headers and payloads;
send the payloads for storage in the order of arrival in a host memory of the host, via the host interface, and send the headers without the payloads for storage in the order of arrival in the DPU memory; and
based on the headers of the received packets, produce a hint that indicates two or more packets that were received in the original order; and
wherein the DPU is to:
receive the hint from the packet processor;
identify the original order of the packets, which were received in the order of arrival that is different from the original order, by inspecting some of the headers, but refraining from identifying the original order of the two or more packets reported in the hint; and
notify the host of locations of payloads the received packets in the host memory, in accordance with the original order.

2. The peripheral device according to claim 1, wherein the DPU is to notify the host of a merged payload comprising the payloads of the two or more packets reported in the hint.

3. The peripheral device according to claim 1, wherein the packet processor is to send the payloads for storage in the host memory by translating a virtual address associated with an address space assigned to a Hypervisor or a Virtual Machine (VM) running on the host, into a respective physical address in the host memory.

4. The peripheral device according to claim 1, wherein the DPU is to access the headers in one or more header buffers in the DPU memory by executing Work Queue Elements (WQEs) in the DPU memory.

5. The peripheral device according to claim 1, wherein the DPU is to process the headers in the DPU memory in accordance with a transport layer protocol used for communication between the host and the remote source.

6. The peripheral device according to claim 5, wherein the transport layer protocol belongs to a list comprising a Transmission Control Protocol (TCP) and a Datagram Congestion Control Protocol (DCCP).

7. A method for communication, comprising:
in a peripheral that mediates communication between a host and remote devices over a communication network,
receiving by a packet processor multiple packets from a remote source over the communication network, wherein the packets originated from the remote source in an original order and were received at the peripheral device in an order of arrival different from the original order;
splitting the received packets into respective headers and payloads;
sending the payloads for storage in the order of arrival in a host memory of the host, and sending the headers without the payloads for storage in the order of arrival in a Data Processing Unit (DPU) memory of a DPU;
based on the headers of the received packets, producing by the packet processor a hint that indicates two or more packets that were received in the original order;
receiving, by the DPU, the hint from the packet processor;
identifying the original order of the packets, which were received in the order of arrival that is different from the original order, by inspecting some of the headers, but refraining from identifying the original order of the two or more packets reported in the hint; and
notifying the host of locations of payloads of the received packets in the host memory, in accordance with the original order.

8. The method according to claim 7, and comprising notifying the host, by the DPU, of a merged payload comprising the payloads of the two or more packets reported in the hint.

9. The method according to claim 7, wherein sending the payloads for storage in the host memory comprises translating a virtual address associated with an address space assigned to a Hypervisor or a Virtual Machine (VM) running on the host, into a respective physical address in the host memory.

10. The method according to claim 7, and comprising accessing the headers in one or more header buffers in the DPU memory by executing Work Queue Elements (WQEs) in the DPU memory.

11. The method according to claim 7, and comprising processing the headers in the DPU memory in accordance with a transport layer protocol used for communication between the host and the remote source.

12. The method according to claim 11, wherein the transport layer protocol belongs to a list comprising a Transmission Control Protocol (TCP) and a Datagram Congestion Control Protocol (DCCP).

13. A method for packet reordering, comprising:
receiving packets destined for a host, in an order of arrival that is different from an original order in which the packets originated from a remote source;
storing payloads of the packets in the order of arrival in a host memory of the host, and storing headers of the packets, without the payloads, in the order of arrival in a Data Processing Unit (DPU) memory of a DPU;
identifying the original order of the packets whose order of arrival differs from the original order, by processing the headers in the DPU memory, but refraining from processing the headers in the DPU memory of two or more packets that were received in the original order as indicated by a hint produced based on the headers of the received packets; and notifying the host of locations of payloads of the received packets in the host memory, in accordance with original order.

* * * * *